April 9, 1957  W. J. REICHERT  2,788,512
LOW FREQUENCY SEISMOMETER
Filed June 9, 1954

INVENTOR
WILHELMUS J. REICHERT
BY
HIS ATTORNEY

United States Patent Office 2,788,512
Patented Apr. 9, 1957

2,788,512
LOW FREQUENCY SEISMOMETER

Wilhelmus J. Reichert, Delft, Netherlands, assignor to Shell Development Company, New York, N. Y., a corporation of Delaware Application June 9, 1954, Serial No. 435,540

Claims priority, application Netherlands June 12, 1953

2 Claims. (Cl. 340—17)

The invention relates to a seismometer for measuring vibrations, and particularly ground vibrations, by means of a coil which is axially movable in a magnetic field and is supported by one or more springs.

It is highly important for the natural frequency of the moving part of the seismometer to be as low as possible. This can be achieved by the use of weak suspension springs and a large moving mass. In this case, however, there is a limit to the minimum natural frequency, inasmuch as if the mass is too large for the very slack springs, they begin to sag or in some other way are incapable of maintaining the vibration system in its proper place, or the system assumes too large dimensions.

It is the object of this invention to provide means whereby it is possible to decrease considerably the minimum natural frequency.

This important result is obtained according to the invention by providing two or more springs under compressive stress in a plane perpendicular to the axial direction of movement of the coil carrier. It is desirable that the resultant of the forces exerted by these springs in this plane is approximately nil.

The invention will be further illustrated with reference to the drawings showing a diagram of an embodiment of the invention.

Figure 1:
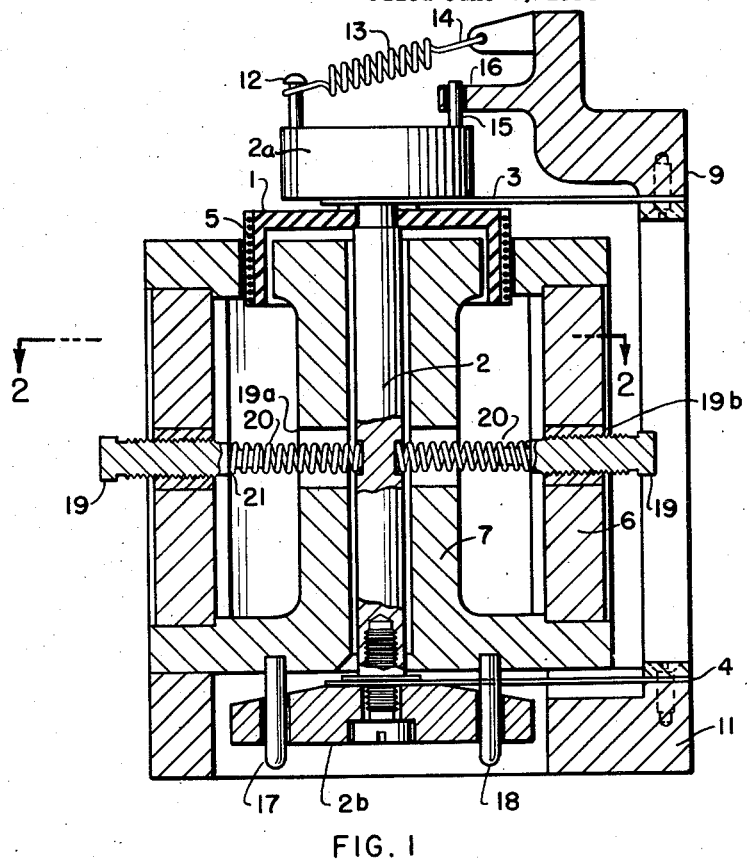
Figure 1 shows an axial cross-section of a seismometer.
Figure 2:
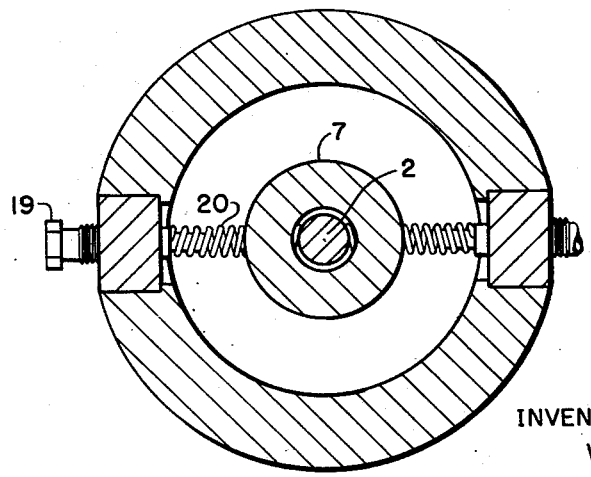
Figure 2 is a cross-sectional view taken on line 2—2 of Figure 1.

A coil 1 is attached to a coil carrier rod 2 which is suspended by means of thin springs 3 and 4 and is movable in the direction of its own axis and of that of the coil. The rod 2 has masses 2a and 2b attached thereto at its ends. The coil is free to move in a very strong magnetic field in a ring slot 5 of a ring magnet having elements 6 and 7. The springs 3 and 4 are anchored at their ends at 9 and 11.

The mass 2a of the coil carrier is connected at 12 to an inclined tension spring 13 anchored at 14, the arrangement and dimensions thereof being such that it compensates the gravity acting on the coil 1, the coil carrier 2 and the masses 2a and 2b in the relevant positions of these elements. If necessary pins 15, 17 and 18 are provided which engage with guiding members, such as illustrated at 16, in order to prevent the possibility of dangerous transverse movements of the coil carrier.

Drilled or otherwise formed in the body of the elements 6 and 7 are passageways 19a. The passageways 19a through the element 6 are provided with a threaded bearing or sleeve 19b adapted to receive an adjusting screw 19 for longitudinal motion therein. Although only two adjusting screws 19 are shown in the drawing, it is obvious that any desired number thereof such as three, four, or more, may be conveniently used.

Anchored to and/or bearing against the inner ends of screws 19 with their ends 21 are springs 20, whose other ends 22 are anchored to and/or bear against the coil carrier 2. Preferably, the axial lines of all screws 19 and springs 20 lie in a single horizontal plane perpendicular to the axis of the coil carrier 2.

It will therefore be readily understood that the compressive forces exerted by these springs on the coil carrier 2 entirely compensate each other so long as the extremities of the springs are in a plane perpendicular to the direction of movement of the coil carrier 2. If, however, the coil carrier 2 is deflected with respect to the anchorage points of the springs, the compressive force of these springs will have a component in the direction of the deflection, whereby the frequency of the natural vibration of the coil carrier system is reduced. The same result is obtained if one or more but not all springs are replaced by supporting elements which are rigid in a radial direction and which enable the coil carrier to move in an axial direction. Further, the springs or supporting elements need not lie in the same plane, provided only they exert a force perpendicular with regard to the axial direction of movement of the coil carrier when it is in equilibrium. The resultant of all forces exerted on the coil carrier in a radial direction must, however, be nil, but for this purpose partial use may also be made of the reaction forces of the suspension springs in a radial direction. The simplest method, however, is to allow the springs to compensate each other's radial forces and to provide them in the same plane which is at right angles to the axial direction of movement of the coil carrier.

It has been found that when the springs 20 exert a very slight compressive force, the natural frequency of the system is somewhat increased by the transverse rigidity of the springs 20, but that when the compressive force is increased the natural frequency falls considerably below the lowest natural frequency which can be obtained when the springs 20 are absent. Only when the natural frequencies are very low—these being in the region of 2 cycles per second in experimental designs to date—does the vibration system become labile. However, the improvement obtained amounts to more than a factor of ⅓ (from 11 cycles per second to 3 to 4 cycles per second), and still further improvements may be obtained by suitable modifications in the design of conventional seismometers according to the principle of the present invention.

I claim as my invention:

1. A low frequency seismometer comprising a magnet having an annular magnetic gap, coil means comprising a coil disposed in said gap and a carrier rod coaxially attached to said coil, spring means supporting said coil for axial motion within said gap, whereby a voltage is generated by said coil, and a plurality of anchored second spring means disposed in compression against said carrier rod to exert against said rod a force in a plane perpendicular to the axis of said rod the resultant force of said spring means in a horizontal plane when the carrier rod is in its normal position of rest being substantially zero.

2. A low frequency seismometer comprising a magnet having an annular magnetic gap, coil means comprising a coil disposed in said gap and a carrier rod coaxially attached to said coil, spring means supporting said coil for axial motion within said gap, whereby a voltage is generated by said coil, a plurality of anchored second spring means disposed in compression against said carrier rod to exert against said rod a force in a plane perpendicular to the axis of said rod the resultant force of said spring means in a horizontal plane when the carrier rod is in its normal position of rest being substantially zero, and means for adjusting the compressive force exerted by said second spring means against said rod.

References Cited in the file of this patent

UNITED STATES PATENTS

| | | |
|---|---|---|
| 2,390,328 | Roberts | Dec. 4, 1945 |
| 2,562,983 | Clewell | Aug. 7, 1951 |
| 2,591,795 | Eisler | Apr. 8, 1952 |
| 2,636,160 | Loper et al. | Apr. 21, 1953 |
| 2,657,374 | Bardeen | Oct. 27, 1953 |